H. W. Pell.
Draught Attach.t for Harv.r

No. 73641 — PATENTED JAN 21 1868

Witnesses:
James L. Ewing
W. Bowen

H. W. Pell
By Knight Bros.
Attorneys

United States Patent Office.

HENRY W. PELL, OF ROME, NEW YORK.

Letters Patent No. 73,641, dated January 21, 1868.

IMPROVEMENT IN HARVESTERS.

*The Schedule referred to in these Letters Patent and making part of the same.*

TO ALL WHOM IT MAY CONCERN:

Be it known that I, HENRY W. PELL, of Rome, in the county of Oneida, and State of New York, have invented a new and useful Improvement in Draught-Attachments for Harvesters; and I do hereby declare the following to be a full, clear, and exact description of the same, reference being had to the accompanying drawings, which are made a part of this specification.

Similar letters of reference represent corresponding parts in the two figures.

Figure 1:
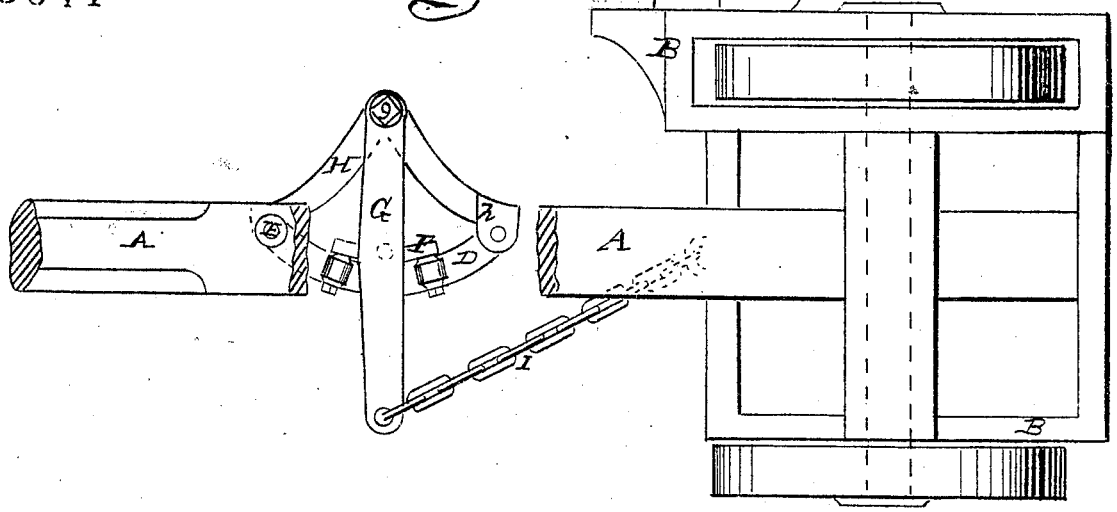
Figure 1 is a plan of a portion of a harvester, illustrating my draught-attachment, a portion of the tongue being removed to expose parts below it.
Figure 2:
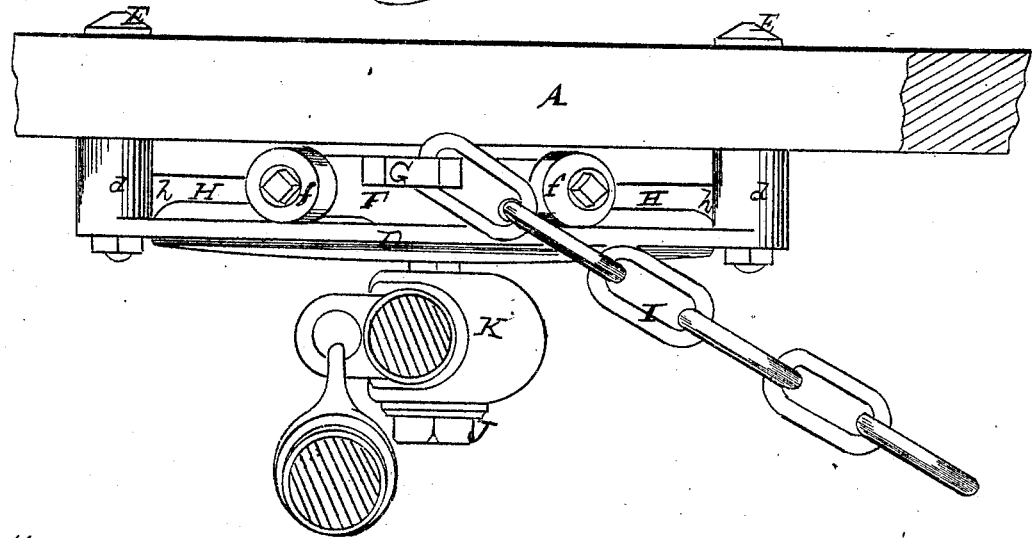
Figure 2 is a side elevation.

The subject of this invention is an attachment for obviating side draught, and at the same time permitting the cutting-apparatus to conform freely to inequalities in the surface of the ground.

In the drawings, A represents the tongue of the machine, B the main frame, and C the finger-bar and cutting-apparatus, all of which may be of common construction. D is a segmental strap, rigidly secured beneath the tongue by bolts, E E, passing through bosses, $d\ d$, which may or may not be cast or forged in one piece with the strap, and serve to hold the strap at the necessary distance from the tongue to accommodate the wheels $f\ f$ of a carriage, F, which is mounted on an arm, G, pivoted at $g$ to the outer end of a bracket, H, rigidly secured at $h\ h$ to the ends of the strap D, and projecting laterally therefrom. The free end of the arm G projects to a distance on the opposite side of the tongue, and is perforated at $g'$ to receive the draught-chain I, which is connected to the main frame or shoe. J represents the whiffle-tree bolt projecting rigidly from the carriage F and pivoted arm G. K represents a double-tree or "evener" mounted on the said bolt.

By means of the chain I, attached to the free end of the lever G, the draught may be applied to the main frame and cutting-apparatus in any line or direction desired, and the strap D, forming a guide-way for the carriage F of the lever G, allows the latter to work freely forward and backward, so as to relieve the pressure of the bar on the ground, and cause it to conform to inequalities and pass over obstructions and uneven surfaces with freedom and ease.

Having thus described my invention, what I claim as new, and desire to secure by Letters Patent, is—

1. The segmental strap or guide-way D, mounted on the tongue A, in combination with the lever G, substantially as set forth.

2. The lever G, in combination with the draught-chain I, connected to the frame B, substantially as and for the purposes specified.

3. Mounting the whiffle-tree bolt in line with the tongue, or nearly so, upon the centre of a lever fulcrumed at one end, and at the other connected by a draught-chain to the frame of the machine, substantially as described.

HENRY W. PELL.

Witnesses:
    H. H. GLINES,
    E. R. PELL.